(12) United States Patent
Tsai

(10) Patent No.: US 7,922,320 B1
(45) Date of Patent: Apr. 12, 2011

(54) EYEGEAR WITH A MOUNTABLE FRAME

(76) Inventor: Tsung-Meng Tsai, Tainan (TW)

( * ) Notice: Subject to any disclaimer, the term of this patent is extended or adjusted under 35 U.S.C. 154(b) by 0 days.

(21) Appl. No.: 12/924,673

(22) Filed: Oct. 1, 2010

(30) Foreign Application Priority Data

Feb. 12, 2010 (TW) .............................. 99203256 U

(51) Int. Cl.
*G02C 1/00* (2006.01)

(52) U.S. Cl. ........................................ 351/86; 351/106

(58) Field of Classification Search ................. 351/86, 351/106, 83, 103, 124, 90, 91, 92, 41, 158, 351/47, 57
See application file for complete search history.

(56) References Cited

U.S. PATENT DOCUMENTS

| | | | | |
|---|---|---|---|---|
| 5,270,743 A | * | 12/1993 | Hofmair et al. | 351/86 |
| 5,467,148 A | * | 11/1995 | Conway | 351/85 |
| 6,550,912 B2 | * | 4/2003 | Vitaloni | 351/47 |
| 6,848,786 B1 | * | 2/2005 | Teng | 351/83 |
| 7,011,404 B2 | * | 3/2006 | Howard et al. | 351/83 |
| 7,497,569 B2 | * | 3/2009 | Webb | 351/106 |
| 7,553,013 B2 | * | 6/2009 | Tsai | 351/86 |

* cited by examiner

*Primary Examiner* — Hung X Dang

(74) *Attorney, Agent, or Firm* — John A. Fortkort; Fortkort & Houston P.C.

(57) ABSTRACT

A frame seat unit of an eyegear includes a pair of frame seats and a bridge interconnecting the frame seats. Each of the frame seats defines an accommodation space that opens downwardly and has a frame strip that defines a top side of the accommodation space. The eyegear further includes a pair of lens units, each removably retained in the accommodation space of a respective one of the frame seats and including a lens frame and a lens. The lens frame has a ring portion for holding the lens therein. For each pair of the frame seat and the respective one of the lens units, one of the frame strip and the lens frame includes a releasably lockable tab, and an other one of the frame strip and the lens frame is formed with an engaging slot for engagement with the releasably lockable tab.

10 Claims, 3 Drawing Sheets

EYEGEAR WITH A MOUNTABLE FRAME

CROSS-REFERENCE TO RELATED APPLICATION

This application claims priority to Taiwanese Application No. 099203256, filed on Feb. 12, 2010.

BACKGROUND OF THE INVENTION

1. Field of the Invention

The invention relates to eyegear, more particularly to eyegear with a mountable frame.

2. Description of the Related Art

A conventional eyegear may permit replacement of some frame parts to change its appearance or function. However, the assembly structure of the conventional eyegear may be complicated, and may make it inconvenient and time consuming to assemble. Improvements may therefore be made with respect to the conventional eyegear.

SUMMARY OF THE INVENTION

An object of the present invention is to provide an eyegear having a simple structure that is easy to assemble.

The eyegear of this invention comprises a frame seat unit that includes a pair of frame seats and a bridge interconnecting the frame seats. Each of the frame seats defines an accommodation space that opens downwardly and has a frame strip that defines a top side of the accommodation space. The eyegear further comprises a pair of lens units, each removably retained in the accommodation space of a respective one of the frame seats and including a lens frame and a lens. The lens frame has a ring portion for holding the lens therein.

For each pair of the frame seat and the corresponding lens unit, one of the frame strip and the lens frame includes an end distal from the bridge and formed with a releasably lockable tab. The releasably lockable tab has opposite first and second sides. In addition, an other one of the frame strip and the lens frame is formed with first and second walls that cooperate to define an engaging slot for engagement with the releasably lockable tab. The first and second walls are respectively disposed at locations corresponding to the first and second sides of the releasably lockable tab.

For each pair of a frame seat and the corresponding lens unit, engagement between the releasably lockable tab and the engaging slot firmly joins together the lens unit and the frame seat.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
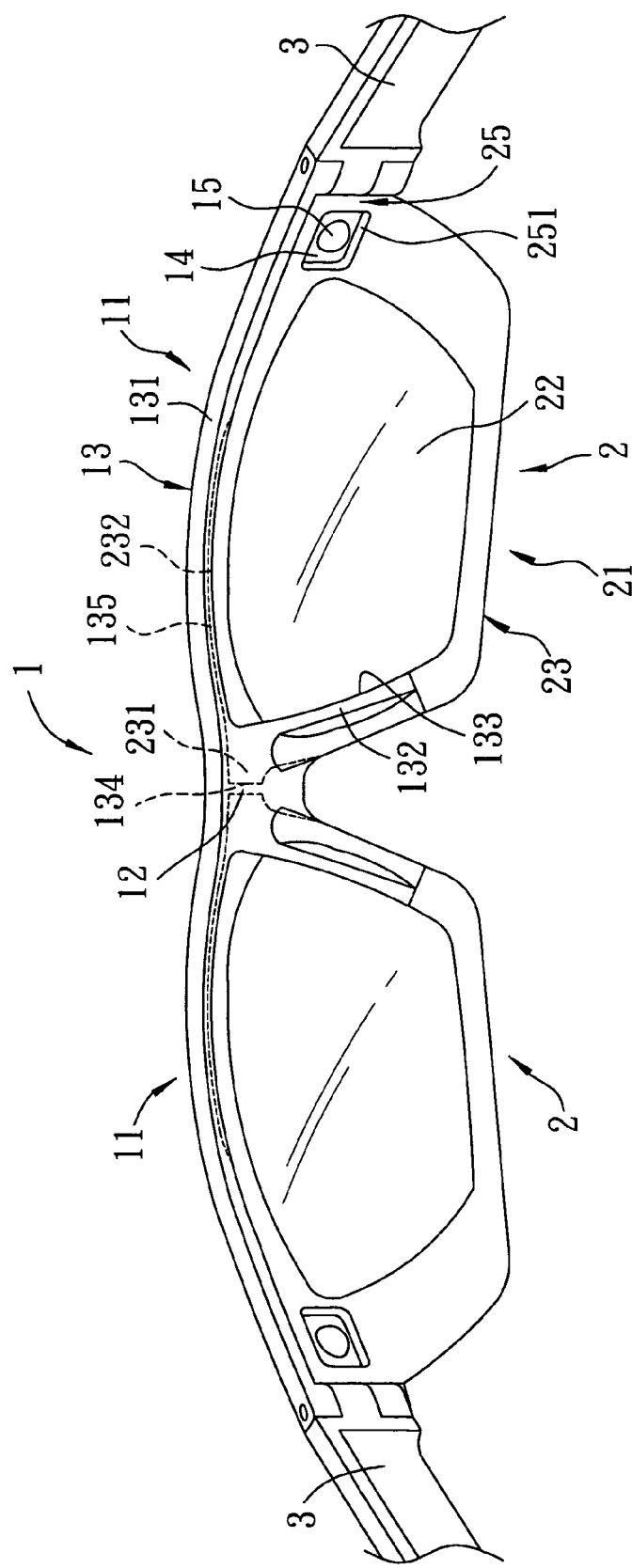
FIG. 1 is a fragmentary perspective view of the preferred embodiment of an eyegear with a mountable frame according to the present invention.
Figure 2:
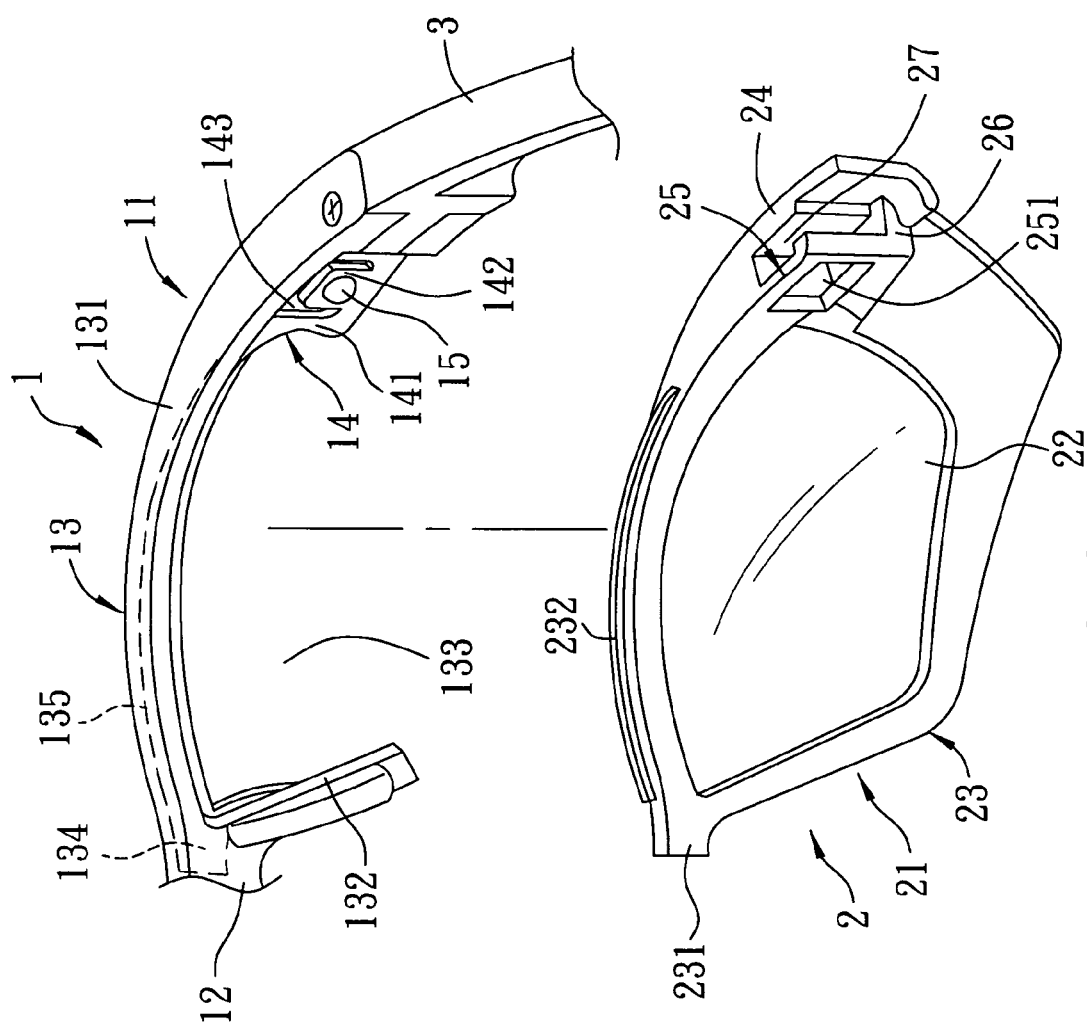
FIG. 2 is a fragmentary partly exploded perspective view of the preferred embodiment.
Figure 3:
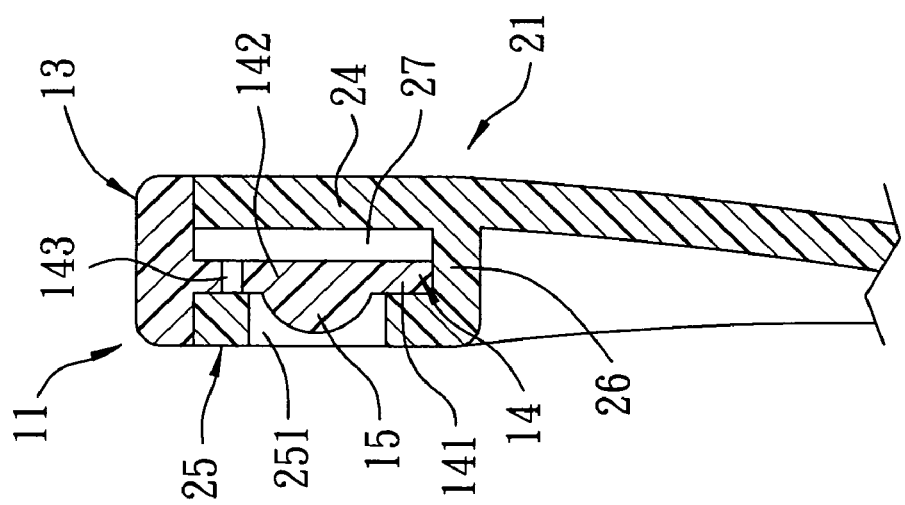
FIG. 3 is a fragmentary sectional schematic view of the preferred embodiment.

As shown in FIGS. 1 to 3, the preferred embodiment of an eyegear with a mountable frame according to the present invention comprises a frame seat unit 1, a pair of lens units 2, and a pair of frame support units 3, each of which extends rearward from a respective lateral side of the frame seat unit 1. In this embodiment, the frame support units 3 can be pivoted relative to the frame seat unit 1. The frame support units 3 can also be fixed to the lateral edges of the frame seat unit 1 or integrally formed with the frame seat unit 1, and are therefore not limited to the disclosed embodiment.

The frame seat unit 1 includes a pair of frame seats 11, and a bridge 12 disposed between and interconnecting the frame seats 11. Each of the frame seats 11 has a frame strip 13 having a frame strip end distal from the bridge 12, and a releasably lockable tab 14 that extends downward from the frame strip end. The releasably lockable tab 14 has opposite front and rear sides (e.g., opposite first and second sides). Each frame seat 11 also has a button 15 extending rearward from a rear side of the releasably lockable tab 14.

Each of the frame strips 13 includes a brow section 131 extending substantially horizontally away from the bridge 12, and a nose section 132 slanting downward from the intersection of the brow section 131 and the bridge 12 and outward toward the corresponding frame strip end. The brow section 131 and the nose section 132 of the frame seat 11 cooperate to define an accommodation space 133 having a downward opening. The brow section 131 of the corresponding frame strip 13 forms the top side of the accommodation space 133.

The frame strip 13 of each of the frame seats 11 is further formed with an engaging hole 134 disposed inside the bridge 12 and in spatial communication with the accommodation space 133. The brow section 131 includes a bottom side formed with an embedding groove 135 in spatial communication with the accommodation space 133. The engaging hole 134 is disposed at one end of the embedding groove 135 that is proximate to the bridge 12.

The releasably lockable tab 14 includes a tab frame 141 extending downwardly from the frame strip end of the brow section 131, and a resilient piece 142 disposed in the tab frame 141 and having a bottom side connected to the tab frame 141. The releasably lockable tab 14 is formed with a downward opening U-shaped gap 143 disposed between the tab frame 141 and the resilient piece 142 and surrounding an area of the resilient piece 142 around the button 15. The button 15 protrudes from a rear side of the resilient piece 142. By the design of the gap 143, the resilient piece 142 is configured to bend resiliently forward and backward to move the button 15 relative to the tab frame 141.

For each pair of a lens unit 2 and the corresponding frame seat 11, the lens unit 2 is removably embedded in the accommodation space 133 of the frame seat 11. The lens unit 2 includes a lens frame 21 and a lens 22 embedded in the lens frame 21. The lens frame 21 has a ring portion 23 in which the lens 22 is embedded. The lens frame 21 further has front and rear wall portions 24, 25 (e.g., first and second wall portions) formed on top of the ring portion 23 at positions corresponding to the front and rear sides of the releasably lockable tab 14. The lens frame 21 further has a support part 26 that connects the bottom edges of the front and rear wall portions 24, 25 to be disposed below the releasably lockable tab 14 when the latter is engaged with the front and rear wall portions 24, 25. The front and rear wall portions 24, 25 and the support part 26 cooperate to define an engaging slot 27 into which the corresponding releasably lockable tab 14 may be inserted.

The ring portion 23 includes an outward protruding engaging block 231 for extension into the engaging hole 134 of the frame seat 11. The ring portion 23 further includes a top side formed with an embedding strip 232 for extending into a corresponding one of the embedding grooves 135. The rear wall portion 25 of the lens frame 21 is further formed with an engagement window 251 for the button 15 of the frame seat 11 to extend through. The engaging slot 27 of the lens frame 21 has a width between the front and rear wall portions 24, 25 that is greater than the corresponding thickness of the resilient piece 142 and the button 15. The width of the engaging slot 27 is sufficient to permit the button 15 to move toward and away from the engagement window 251 for engagement and disengagement, respectively.

For assembly of each pair of a lens unit 2 and the corresponding frame seat 11, first the engaging block 231 of the lens unit 2 is oriented in the accommodation space 133 before being extended into the engaging hole 134 of the frame seat 11. At the same time, the embedding strip 232 is embedded in the embedding groove 135, after which the releasably lockable tab 14 is inserted into the engaging slot 27. At the same time, the button 15 is pressed by the rear wall portion 25, which bends the resilient piece 142 until the engagement window 251 moves up to a position that corresponds with the button 15. At that time, the resilient piece 142 immediately moves the button 15 rearward into the engagement window 251 for engagement and to secure the lens unit 2 in the accommodation space 133 of the frame seat 11.

For disassembly, the button 15 is pressed, causing it to move forward out of the engagement window 251. The lens unit 2 may then be pulled downward to disengage the releasably lockable tab 14 from the engaging slot 27, the engaging block 231 from the engaging hole 134, and the embedding strip 232 from the embedding groove 135. The lens unit 2 may then be disengaged from the frame seat 11, and may be installed in a different frame seat unit 1.

In variations of the preferred embodiment, for each pair of a lens unit 2 and the corresponding frame seat 11, the positions of the releasably lockable tab 14 and the front and rear walls 24, 25 that define the engaging slot 27 may be exchanged. Similarly, the side of the releasably lockable tab 14 on which the button 15 is formed, and the corresponding front or rear wall 24, 25 formed with the engagement window 251 may also be exchanged. Likewise, the positions of the embedding strip 232 and the embedding groove 135 may be exchanged.

While the present invention has been described in connection with what is considered the most practical and preferred embodiment, it is understood that this invention is not limited to the disclosed embodiment but is intended to cover various arrangements included within the spirit and scope of the broadest interpretation to encompass all such modifications and equivalent arrangements.

What is claimed is:

1. An eyegear, comprising:
a frame seat unit including a pair of frame seats and a bridge interconnecting said frame seats, each of said frame seats defining an accommodation space that opens downwardly and having a frame strip that defines a top side of said accommodation space; and
a pair of lens units, each removably retained in said accommodation space of a respective one of said frame seats and including a lens frame and a lens, said lens frame having a ring portion for holding said lens therein,
wherein, for each pair of said frame seat and the respective one of said lens units,
one of said frame strip and said lens frame includes an end distal from said bridge and formed with a releasably lockable tab, said releasably lockable tab having opposite first and second sides,
an other one of said frame strip and said lens frame being formed with first and second walls that cooperate to define an engaging slot for engagement with said releasably lockable tab, said first and second walls being respectively disposed at locations corresponding to said first and second sides of said releasably lockable tab.

2. The eyegear as claimed in claim 1, wherein one of said first and second sides of said releasably lockable tab is formed with a button, a corresponding one of said first and second walls being formed with an engagement window for said button to extend through.

3. The eyegear as claimed in claim 2, wherein said releasably lockable tab is formed with a gap around a partial periphery of said button such that said button is operable to move toward and away from said engagement window.

4. The eyegear as claimed in claim 3, wherein said releasably lockable tab includes a resilient piece partially bordered by said gap and extended toward said one of said frame strip and said lens frame, said button being formed on said resilient piece.

5. The eyegear as claimed in claim 3, wherein said releasably lockable tab is formed on said frame strip.

6. The eyegear as claimed in claim 1, wherein said other one of said frame strip and said lens frame is further formed with a support part from which said first and second walls extend, said support part cooperating with said first and second walls to define said engaging slot.

7. The eyegear as claimed in claim 1, wherein, for each pair of said frame seat and the respective one of said lens units,
one of said frame strip and said lens frame is formed with an engaging hole,
an other one of said frame strip and said lens frame being formed with an engaging block for engagement with said engaging hole.

8. The eyegear as claimed in claim 7, wherein
one of a bottom side of said frame strip and a top side of said ring portion of said lens frame is formed with an embedding groove,
an other one of said bottom side of said frame strip and said top side of said ring portion of said lens frame being formed with an embedding strip for engagement with said embedding groove.

9. The eyegear as claimed in claim 8, wherein said engaging hole is disposed at one end of said embedding groove that is proximate to said bridge.

10. The eyegear as claimed in claim 1, wherein said frame seats have distal ends distal from each other, said eyegear further comprising a pair of eyegear support units that are each coupled to said distal end of a corresponding one of said frame seats.

* * * * *